United States Patent
Czarnecki

(10) Patent No.: US 9,120,055 B2
(45) Date of Patent: Sep. 1, 2015

(54) MERCURY RE-EMISSION CONTROL

(71) Applicant: ALSTOM Technology Ltd, Baden (CH)

(72) Inventor: Lawrence Joseph Czarnecki, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/164,863

(22) Filed: Jan. 27, 2014

(65) Prior Publication Data
US 2015/0209725 A1 Jul. 30, 2015

(51) Int. Cl.
| | |
|---|---|
| B01D 53/64 | (2006.01) |
| B01D 53/74 | (2006.01) |
| B01D 53/78 | (2006.01) |
| B01D 53/50 | (2006.01) |
| B01D 53/34 | (2006.01) |

(52) U.S. Cl.
CPC .............. *B01D 53/64* (2013.01); *B01D 53/346* (2013.01); *B01D 53/501* (2013.01)

(58) Field of Classification Search
CPC ........ B01D 53/64; B01D 53/74; B01D 53/78; B01D 53/8665
USPC ............. 423/210; 95/134; 422/105, 108, 111, 422/168
See application file for complete search history.

(56) References Cited

U.S. PATENT DOCUMENTS

| | | | |
|---|---|---|---|
| 3,961,020 | A | 6/1976 | Seki |
| 4,502,872 | A | 3/1985 | Ivester et al. |
| 4,889,698 | A | 12/1989 | Moller et al. |

(Continued)

FOREIGN PATENT DOCUMENTS

| | | |
|---|---|---|
| CN | 102 807 680 A | 12/2012 |
| DE | 102004044291 | 3/2006 |

(Continued)

OTHER PUBLICATIONS

Todd R Carey; "Assessing sorbent injection mercury control effectiveness in flue gas streams" Environmental Progress, American Institute of Chemical Engineers, US, vol. 19, No. 3, 2000, pp. 167-174, XP002336971.

(Continued)

*Primary Examiner* — Timothy Vanoy
(74) *Attorney, Agent, or Firm* — Rita D. Vacca

(57) ABSTRACT

A method for reducing mercury emission and/or re-emission in cleaned flue gas through control of dissolved mercury species concentration within a wet flue gas desulfurization (WFGD) system is disclosed. One method for reducing mercury emission and/or re-emission through control of dissolved mercury species concentration is to measure the dissolved mercury species concentration of an aqueous alkaline slurry used in a WFGD system and/or measuring mercury concentration of cleaned flue gas from a WFGD system and comparing the same to a predetermined dissolved mercury species concentration value and/or a predetermined mercury concentration value. If the comparison reveals the measured dissolved mercury species concentration or mercury concentration is above the predetermined values therefor, the amount of cyclodextrin additive supplied to the system is increased. If the comparison reveals the measured dissolved mercury species concentration or mercury concentration is below the predetermined values, the amount of cyclodextrin additive supplied to the system is decreased.

15 Claims, 1 Drawing Sheet

(56) References Cited

U.S. PATENT DOCUMENTS

| | | | |
|---|---|---|---|
| 5,435,980 A | 7/1995 | Felsvang et al. | |
| 5,505,766 A | 4/1996 | Chang | |
| 5,527,496 A | 6/1996 | Rogers et al. | |
| 5,556,447 A | 9/1996 | Srinivasachar et al. | |
| 5,569,436 A | 10/1996 | Lerner | |
| 5,672,323 A | 9/1997 | Bhat et al. | |
| 5,854,173 A | 12/1998 | Chang et al. | |
| 6,027,551 A | 2/2000 | Hwang et al. | |
| 6,322,613 B1 | 11/2001 | Wojtowicz et al. | |
| 6,451,094 B1 | 9/2002 | Chang et al. | |
| 6,521,021 B1 | 2/2003 | Pennline et al. | |
| 6,558,454 B1 | 5/2003 | Chang et al. | |
| 6,719,828 B1 | 4/2004 | Lovell et al. | |
| 6,818,043 B1 | 11/2004 | Chang et al. | |
| 6,848,374 B2 | 2/2005 | Srinivasachar et al. | |
| 6,878,358 B2 | 4/2005 | Vosteen et al. | |
| 7,033,548 B2 | 4/2006 | Pahlman et al. | |
| 7,153,481 B2 | 12/2006 | Bengtsson et al. | |
| 7,361,209 B1 | 4/2008 | Durham et al. | |
| 8,828,341 B1 * | 9/2014 | Appelo et al. | 423/210 |
| 2002/0150516 A1 | 10/2002 | Pahlman et al. | |
| 2003/0103882 A1 | 6/2003 | Biermann et al. | |
| 2003/0206843 A1 | 11/2003 | Nelson, Jr. | |
| 2004/0003716 A1 | 1/2004 | Nelson, Jr. | |
| 2004/0086439 A1 | 5/2004 | Vosteen et al. | |
| 2011/0014104 A1 | 1/2011 | Ghorishi et al. | |
| 2011/0262326 A1 * | 10/2011 | Steen et al. | 423/210 |
| 2012/0321539 A1 | 12/2012 | Steen et al. | |
| 2013/0180923 A1 | 7/2013 | Keiser et al. | |

FOREIGN PATENT DOCUMENTS

| | | | |
|---|---|---|---|
| EP | 0 253 563 | 1/1988 | |
| EP | 1 275 430 | 1/2003 | |
| EP | 1 645 323 | 4/2006 | |
| JP | 2-191526 A * | 7/1990 | 422/111 |
| KR | 2002 004126 A | 1/2002 | |
| WO | WO 93/20926 | 10/1993 | |
| WO | WO 03/093518 | 11/2003 | |
| WO | WO 2004/108254 | 12/2004 | |
| WO | WO 2013/050990 | 4/2013 | |

OTHER PUBLICATIONS

John Tarabocchia, PE; Mercury Separation from Flue Gas and Scrub Water with Trimercapto-s-triazine (TMT) Control/Tracking No. 03-A-15-AWMA (17 pages).

European Search Report—EP Application No. 05021227.3, dated Feb. 17, 2006.

European Search Report for EP Appln. No. 14199490.5, dated Jun. 8, 2015.

* cited by examiner

MERCURY RE-EMISSION CONTROL

FIELD OF THE DISCLOSURE

The subject matter disclosed herein generally relates to controlling or preventing an amount of mercury discharged to an environment incident to combustion of a fuel source containing mercury or mercury compounds, and more specifically to controlling or preventing mercury emission and/or re-emission in a combustion flue gas subjected to a wet scrubbing operation.

BACKGROUND OF THE DISCLOSURE

Combustion of fuel sources such as coal produces a waste gas, referred to as "flue gas" that is to be emitted into an environment, such as the atmosphere. The fuel sources typically contain sulfur and sulfur compounds which are converted in the combustion process to gaseous species, including sulfur oxides, which then exist as such in the resulting flue gas. The fuel sources typically also contain elemental mercury or mercury compounds which are converted in the combustion process to, and exist in the flue gas as, gaseous elemental mercury or gaseous ionic mercury species.

As such, flue gas contains particles, noxious substances and other impurities considered to be environmental contaminants. Prior to emission into the atmosphere via a smoke stack, hereinafter a "stack", the flue gas undergoes a cleansing or purification process. In coal combustion, one aspect of this purification process is normally a desulfurization system, such as a wet scrubbing operation commonly known as a wet flue gas desulfurization (WFGD) system.

Sulfur oxides are removed from flue gas using a WFGD system by introducing an aqueous alkaline slurry to a scrubber tower of the WFGD system. The aqueous alkaline slurry typically includes a basic material that will interact with contaminants to remove them from the flue gas. Examples of basic materials that are useful in the aqueous alkaline slurry include lime, limestone, magnesium, combinations thereof and the like.

Recently, there has been an increased focus on the removal of mercury. Presently, there are various methods for removing mercury from flue gas. Those methods include addition of oxidizing agents in a boiler upstream of the flue gas emission control system and then removing the same with scrubbers, addition of reactants to bind mercury and removing the same from the flue gas, and utilization of particular coal or fuel to minimize the amount of mercury released when the coal or fuel is burned.

A number of generally known methods of mercury removal are effective to produce mercury salts, which can be dissolved and removed by the aqueous alkaline slurry used in the wet scrubbing operation. Some of these methods include the addition of a halogen or halogen compounds, such as bromine, to the coal or to the flue gas upstream of the wet scrubbing operation to provide oxidation of elemental mercury to ionic mercury and formation of mercury salts, which are then dissolved in the aqueous alkaline slurry incident to the sulfur oxide removal processes. However, the removal of mercury in the aqueous alkaline slurry of a wet scrubber has proven to be difficult to control when designing a flue gas cleaning system with respect to mercury removal. The desired emission guarantee levels are often as low as 0.3 µg/Nm$^3$ of mercury, which corresponds to a very high mercury removal efficiency in the wet scrubber.

SUMMARY OF THE DISCLOSURE

One aspect of the subject matter disclosed herein relates to a method for removing an amount of mercury from a flue gas generated by combustion of a fuel source to reduce mercury emission and/or re-emission to an environment such as the atmosphere. The method includes subjecting the flue gas to a wet scrubbing operation to decrease an amount of sulfur oxides present in the flue gas. The wet scrubbing operation comprises contacting the flue gas with an aqueous alkaline slurry to absorb the sulfur oxides from the flue gas, dissolving at least a portion of gaseous ionic mercury species present in the flue gas in the aqueous alkaline slurry to remove the gaseous ionic mercury species from the flue gas to produce cleaned flue gas, and including a cyclodextrin additive to the aqueous alkaline slurry to complex with the dissolved mercury species to form chemically stable complexes to prevent mercury re-emission into the cleaned flue gas and releasing the cleaned flue gas to the environment. The problem overcome by this method is that once oxidized by the aqueous alkaline slurry, the mercury can under some conditions be reduced to elemental mercury. Elemental mercury has a high vapor pressure and thus can be re-emitted into the "cleaned" flue gas. The present method controls mercury re-emission by using cyclodextrin to complex with the dissolved mercury species to form chemically stable complexes that do not reduce to form elemental mercury. As such, elemental mercury re-emission into the cleaned flue gas is prevented. The subject invention as disclosed herein is an improvement over known methods of preventing mercury re-emissions such as by adding sulfur containing chemicals such as sodium hydrosulfide, sodium sulfides, trimercaptotriazine, polydithiocarbamate, didethyl dithiocarbamate, or the like, to the aqueous alkaline slurry. Such sulfur containing chemicals have questionable health, odor, handling, and like issues associated therewith.

In summary, a method is provided herein for controlling, reducing or preventing mercury emission or re-emission levels in a cleaned combustion flue gas comprising supplying a combustion flue gas to a WFGD system for direct contact with an aqueous alkaline slurry for removal of contaminants from the flue gas to produce a cleaned flue gas, measuring a dissolved mercury species concentration, a mercury concentration, or both to obtain a measured concentration value in the WFGD system for comparison to a predetermined concentration value, and adjusting an amount of cyclodextrin additive supplied to the WFGD system to increase or decrease the measured concentration value to reduce levels of mercury emission and/or re-emission in the produced cleaned flue gas. According to the method, the dissolved mercury species concentration is measured in the aqueous alkaline slurry of the WFGD system, such as a spray tower type WFGD system. The mercury concentration is measured in the cleaned flue gas from the WFGD system, such as a spray tower type WFGD system. The cyclodextrin additive supplied to the WFGD system is one or more complexing agents selected from the group consisting of α-cyclodextrin, β-cyclodextrin, γ-cyclodextrin, derivatives of α-cyclodextrin, derivatives of β-cyclodextrin, derivatives of γ-cyclodextrin, derivatives of cyclodextrin prepared by condensation of α-, β-, or γ-cyclodextrins with epoxides, and mixtures thereof. The cyclodextrin additive is supplied to the aqueous alkaline slurry of the WFGD system as a solid or a solution. An agitator may be used to distribute the cyclodextrin additive throughout the aqueous alkaline slurry.

A system for reducing mercury emission or re-emission levels in a cleaned combustion flue gas is also provided comprising a WFGD system with an aqueous alkaline slurry for direct contact with a combustion flue gas flowing therethrough, a collection tank for collecting the aqueous alkaline slurry following direct contact with the combustion flue gas with one or more dissolved mercury species sensors arranged therein for measuring a dissolved mercury species concentration in the collected aqueous alkaline slurry to obtain a measured dissolved mercury species concentration, a control device to compare the measured dissolved mercury species concentration to a predetermined dissolved mercury species concentration and based thereon control a device, and a device controlled by the control device is operative for adjusting an amount of a cyclodextrin additive supplied to the aqueous alkaline slurry to increase or decrease dissolved mercury species concentration to reduce levels of mercury emission and/or re-emission in a produced cleaned flue gas. The subject system may further comprise one or more mercury sensors in an outlet of the WFGD system for measuring a mercury concentration in a cleaned flue gas flowing therethrough to obtain a measured mercury concentration, the control device operative to compare the measured mercury concentration to a predetermined mercury concentration and based thereon control the device operative for adjusting an amount of a cyclodextrin additive supplied to the aqueous alkaline slurry to increase or decrease dissolved mercury species concentration to reduce levels of mercury emission and/or re-emission in a produced cleaned flue gas. The system may further comprise an agitator to distribute cyclodextrin additive throughout aqueous alkaline slurry wherein the cyclodextrin additive is one or more complexing agents selected from the group consisting of α-cyclodextrin, β-cyclodextrin, γ-cyclodextrin, derivatives of α-cyclodextrin, derivatives of β-cyclodextrin, derivatives of γ-cyclodextrin, derivatives of cyclodextrin prepared by condensation of α-, β-, or γ-cyclodextrins with epoxides, and mixtures thereof.

A system for reducing mercury emission or re-emission levels in a cleaned combustion flue gas is also provided comprising a WFGD system with an aqueous alkaline slurry for direct contact with a combustion flue gas flowing therethrough, a collection tank for collecting the aqueous alkaline slurry following direct contact with the combustion flue gas with one or more mercury sensors arranged therein for measuring a mercury concentration in the cleaned flue gas to obtain a measured mercury concentration, a control device to compare the measured mercury concentration to a predetermined mercury concentration and based thereon control a device, and a device controlled by the control device operative for adjusting an amount of a cyclodextrin additive supplied to the aqueous alkaline slurry to increase or decrease dissolved mercury species concentration therein to reduce levels of mercury emission and/or re-emission in a produced cleaned flue gas. The subject system may further comprise one or more dissolved mercury species sensors in the aqueous alkaline slurry of the WFGD system for measuring a dissolved mercury species concentration to obtain a measured dissolved mercury species concentration, the control device operative to compare the measured dissolved mercury species concentration to a predetermined dissolved mercury species concentration and based thereon control the device operative for adjusting an amount of a cyclodextrin additive supplied to the aqueous alkaline slurry to increase or decrease dissolved mercury species concentration to reduce levels of mercury emission and/or re-emission in a produced cleaned flue gas. The system may further comprise an agitator to distribute cyclodextrin additive throughout aqueous alkaline slurry wherein the cyclodextrin additive is one or more complexing agents selected from the group consisting of α-cyclodextrin, β-cyclodextrin, γ-cyclodextrin, derivatives of α-cyclodextrin, derivatives of β-cyclodextrin, derivatives of γ-cyclodextrin, derivatives of cyclodextrin prepared by condensation of α-, β-, or γ-cyclodextrins with epoxides, and mixtures thereof.

BRIEF DESCRIPTION OF THE DRAWINGS

For the purpose of illustrating the subject matter disclosed herein, the drawing shows a form of the embodiment that is presently preferred. However, it should be understood that the disclosed subject matter is not limited to the precise arrangements and instrumentalities shown in the drawing, wherein.

DETAILED DESCRIPTION OF THE INVENTION

Figure 1:
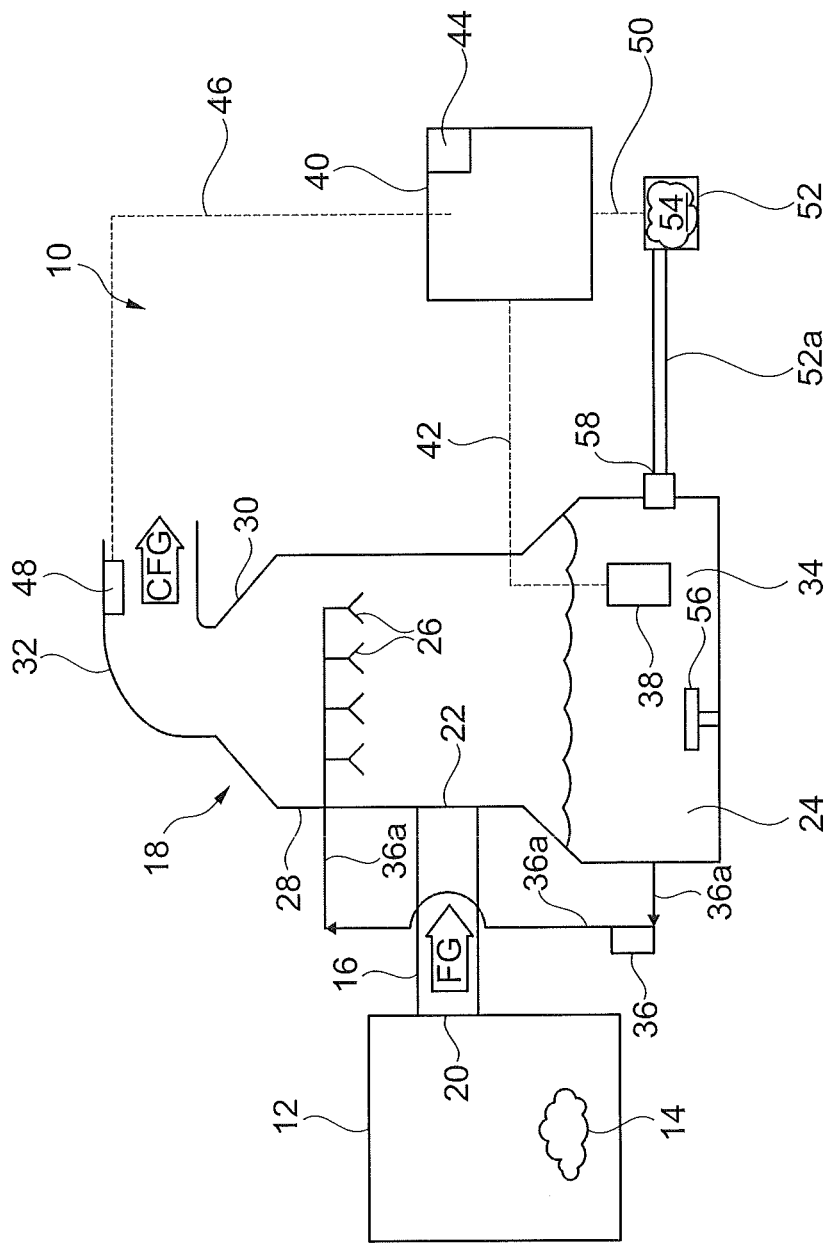
FIG. 1 is a schematic representation of a system for reducing an amount of gaseous elemental mercury emitted in a flue gas, which is practiced using a WFGD system.

The present inventor has discovered that using one or more cyclodextrins, one or more derivatives of cyclodextrin, such as for example derivatives prepared by condensation of α-, β-, or γ-cyclodextrins with epoxides such as for example propylene oxide, isobutylene oxide, epichlorohydrin or 1,4-butanediol diglycidyl ether, as known to those in the pharmaceutical sciences, or a mixture thereof as an additive in the aqueous alkaline slurry of a WFGD system can control dissolved mercury species by complexing therewith, thereby controlling and reducing mercury emissions and/or re-emissions of cleaned flue gas. In WFGD systems using limestone for absorption of acid gases and where a gypsum slurry is circulated, the use of a cyclodextrin additive, as used herein meaning one or more cyclodextrins, one or more derivatives of cyclodextrin or a mixture thereof, controls mercury emissions and/or re-emissions without compromising the quality of the gypsum by-product for other uses, such as for use in construction dry wall. Such is not necessarily true of chemical additives such as sodium hydrosulfide, sodium sulfides, trimercaptotriazine, polydithiodcarbamate, didethyldithiocarbamate, and the like, having questionable health, odor, handling, and similar undesirable considerations.

The present method and system for reducing mercury emissions and/or re-emissions in cleaned flue gas by complexing dissolved mercury species with a cyclodextrin additive are described in detail below.

Referring now to FIG. 1, one embodiment of the subject system 10 is illustrated. System 10 comprises a boiler 12 for the combustion of a carbonaceous fuel 14, such as but not limited to coal. Combustion of the carbonaceous fuel 14 produces a flue gas "FG" comprising acid gases, gaseous heavy metals, particulates and the like, hereafter referred to collectively as contaminants. The flue gas FG flows from outlet 20 of boiler 12 through fluidly connected duct 16 and into inlet 22 of fluidly connected WFGD system 18. Optionally, additional equipment systems known to those skilled in the art may be arranged between boiler 12 and WFGD system 18, but are not described herein for purposes of clarity.

Once inside WFGD system 18, flue gas FG comes into direct contact with an aqueous alkaline slurry 24 to remove contaminants from the flue gas FG. While WFGD system 18 is described herein as a spray tower for purposes of clarity, other types of WFGD systems known to those skilled in the art are equally suitable. Within WFGD system 18, aqueous alkaline slurry 24 is introduced into the WFGD system 18 through one or more nozzles 26 in an upper portion 28 of a scrubber tower 30. As noted above, aqueous alkaline slurry 24 removes contaminants such as sulfur oxides from flue gas FG. Removal of mercury salts is incident to this sulfur oxide removal process. Removal of such contaminants from flue gas FG produces cleaned flue gas "CFG". Cleaned flue gas CFG flows out from WFGD system 18 through outlet 32.

From outlet 32, cleaned flue gas CFG may flow to a fluidly connected stack (not shown) or other emissions control apparatus (not shown).

Aqueous alkaline slurry 24 is transported to nozzles 26 from fluidly connected collecting tank 34 via one or more pumps 36 and fluidly connected piping 36a. The amount of aqueous alkaline slurry 24 transported to nozzles 26 depends upon several factors such as but not limited to the amount of flue gas FG present in the scrubber tower 30, the amount of contaminants in the flue gas FG, and/or the design of the WFGD system 18. After the aqueous alkaline slurry 24 directly contacts the flue gas FG and removes contaminants therefrom, the aqueous alkaline slurry 24 is collected in collecting tank 34 for recirculation to nozzles 26 by pumps 36 via piping 36a.

To reduce mercury emission and/or re-emission from the scrubber tower 30, one or more mercury sensors 38 may be arranged in the aqueous alkaline slurry 24 in collecting tank 34. Mercury sensors 38 are commercially available sensors, such as for example a Mercury Process Analyzer PA-2 available from Mercury Instruments USA, Littleton, Colo., USA. Mercury sensors 38 may be used to measure the concentration of dissolved mercury species present in the aqueous alkaline slurry 24 in collecting tank 34. Mercury sensors 38 may measure dissolved mercury species concentrations either continuously or at predetermined intervals. For example, predetermined intervals for dissolved mercury species concentration measurement may be determined automatically by a control device 40 in communication with the mercury sensors 38, or manually by a user. As another option, another form of mercury sensor could be used for off-line analysis. As such, first a sample of the slurry is obtained. Secondly, the dissolved mercury content of the sample is measured using an analytical device present where the sample is taken or located in a separate facility. Such mercury analytical devices are commercially available. An example of such a mercury analytical device is the DMA-80 available from Milestone, Inc., Shelton, Conn., USA.

Dissolved mercury species concentration measurements measured by mercury sensors 38 are sent as a signal 42 indicative of the measured dissolved mercury species concentration(s) to control device 40. Control device 40 may include for example but not limited to a computer, a microprocessor, an application specific integrated circuit, circuitry, or any other device capable of transmitting and receiving electrical signals from various sources, at least temporarily storing data indicated by such signals 42, and perform mathematical and/or logical operations on the data indicated by such signals 42. Control device 40 may include or be connected to a monitor, a keyboard, or other user interface, and includes an associated memory device 44.

Control device 40 compares the measured dissolved mercury species concentration(s) to one or more predetermined dissolved mercury species concentration values as a set point, which may be stored in memory device 44. It is contemplated that the one or more predetermined dissolved mercury species concentration potential values may comprise a single value or a range of values. The predetermined value(s) may be a user-input parameter. For example, the predetermined dissolved mercury species concentration values may be from about 0.01 parts per billion (ppb) to about 2500 ppb. By "predetermined" it is simply meant that the value is determined before the comparison is made with the actual measured dissolved mercury species concentration(s) as measured by the mercury sensors 38.

Optionally, a mercury measurement device 48 may be used in the subject system in addition to or instead of mercury sensors 38, to measure mercury emission/re-emission levels. Mercury measurement device 48 is any device suitable to measure elemental mercury emitted from scrubber tower 30. Examples include but are not limited to continuous emission monitors (CEMs), such as cold-vapor atomic absorption spectrometry (CVAAS), cold-vapor atomic fluorescence spectrometry (CVAFS), in-situ ultraviolet differential optical absorption spectroscopy (UVDOAS), and atomic emission spectrometry (AES). Mercury measurement device 48 may measure mercury concentrations either continuously or at predetermined intervals. For example, predetermined intervals for mercury concentration measurement may be determined automatically by a control device 40 in communication with the mercury measurement device 48, or manually by a user. As such, control device 40 compares the measured mercury concentration(s) to one or more predetermined mercury concentration values as a set point, which may be stored in memory device 44. It is contemplated that the one or more predetermined mercury concentration potential values may comprise a single value or a range of values. The predetermined value(s) may be a user-input parameter. For example, the predetermined mercury concentration values may be from about 0.1 micrograms per cubic meter to about 100 micrograms per cubic meter. By "predetermined" it is simply meant that the value is determined before the comparison is made with the actual measured mercury concentration(s) as measured by the mercury measurement device 48.

Comparison of the measured dissolved mercury species concentration and/or mercury concentration to the one or more predetermined concentration values causes control device 40 to provide a control signal 50 to an automated cyclodextrin additive supply source 52. Cyclodextrin additive supply source 52 adjusts an amount of cyclodextrin additive 54, which is introduced via fluidly connected piping 52a into the aqueous alkaline slurry 24 collected in fluidly connected collection tank 34 in response to control signal 50. Adjustments in the amount of cyclodextrin additive 54 introduced to fluidly connected collecting tank 34 are based on the dissolved mercury species concentration of the aqueous alkaline slurry 24 present in collecting tank 34 and/or the mercury concentration measured in the cleaned flue gas CFG, for control of mercury emissions and/or re-emissions.

For example, if the comparison of the measured mercury concentration and the predetermined mercury concentration values reveals that the measured mercury concentration is greater than the predetermined mercury concentration values, control device 40 may provide a control signal 50 to the cyclodextrin additive supply source 52 to cause the cyclodextrin additive supply source 52 to increase the amount of cyclodextrin additive 54 introduced into collecting tank 34 through input 58. Conversely, if the comparison reveals that the measured mercury concentration is lower than the predetermined mercury concentration values, control device 40 may provide a control signal 50 to the cyclodextrin additive supply source 52 to cause the cyclodextrin additive supply source 52 to decrease the amount of cyclodextrin additive 54 introduced into collecting tank 34 through input 58. As such, it is possible to limit levels of emission and/or re-emission of mercury at outlet 32, while minimizing cyclodextrin additive 54 consumption. It is contemplated that control device 40 may employ known control algorithms, e.g., proportional, integral, and/or derivative control algorithms, to adjust, control signal 50 in response to the comparison of the measured mercury concentration and the predetermined mercury concentration values. For example, a 6:1 cyclodextrin additive to mercury molar ratio may be used for efficiently limiting levels of mercury emissions and/or re-emissions.

Cyclodextrin additive supply source 52 may be of any suitable type capable of introducing varying amounts of cyclodextrin additive 54 to aqueous alkaline slurry 24 in collecting tank 34. Additionally, collecting tank 34 may include an agitator 56 to distribute cyclodextrin additive 54 throughout aqueous alkaline slurry 24.

One method for using system 10 illustrated in FIG. 1 is to supply combustion flue gas FG to a WFGD system 10 for direct contact with an aqueous alkaline slurry 24 for removal of contaminants from the flue gas FG. This method comprises measuring a dissolved mercury species concentration in the WFGD system 10 aqueous alkaline slurry 24 for comparison to a predetermined dissolved mercury species concentration value, and adjusting an amount of cyclodextrin additive 54 supplied to the WFGD system 10 aqueous alkaline slurry 24 to increase or decrease dissolved mercury species concentration to maintain a set point for mercury emission and/or re-emission reduction in produced cleaned flue gas CFG.

Another method for using system 10 illustrated in FIG. 1 is to supply combustion flue gas FG to a WFGD system 10 for direct contact with an aqueous alkaline slurry 24 for removal of contaminants from the flue gas FG, measuring a mercury concentration in the cleaned flue gas CFG of the WFGD system 10 for comparison to a predetermined mercury concentration value, and adjusting an amount of cyclodextrin additive 54 supplied to the WFGD system 10 aqueous alkaline slurry 24 to increase or decrease dissolved mercury species concentration to maintain a set point for mercury emission and/or re-emission reduction in produced cleaned flue gas CFG.

For the methods described herein, system 10 illustrated in FIG. 1 includes an automated cyclodextrin additive supply source 52 for a supply of cyclodextrin additive 54 to aqueous alkaline slurry 24 of WFGD system 10 supplied with combustion flue gas FG for direct contact with the aqueous alkaline slurry 24 and cyclodextrin additive 54 to control, reduce and/or prevent mercury emission and/or re-emission in produced cleaned flue gas.

In summary, a method is provided herein for controlling, reducing or preventing mercury emission or re-emission levels in a cleaned combustion flue gas FG comprising supplying a combustion flue gas FG to a WFGD system 10 for direct contact with an aqueous alkaline slurry 24 for removal of contaminants from the flue gas FG to produce a cleaned flue gas CFG, measuring a dissolved mercury species concentration, a mercury concentration, or both to obtain a measured concentration value in the WFGD system 10 for comparison to a predetermined concentration value, and adjusting an amount of cyclodextrin additive 54 supplied to the WFGD system 10 to increase or decrease the measured concentration value to reduce levels of mercury emission and/or re-emission in the produced cleaned flue gas CFG. According to the method, the dissolved mercury species concentration is measured in the aqueous alkaline slurry 24 of the WFGD system 10, such as a spray tower type WFGD system. The mercury concentration is measured in the cleaned flue gas CFG from the WFGD system 10, such as a spray tower type WFGD system. The cyclodextrin additive 54 supplied to the WFGD system 10 is one or more complexing agents selected from the group consisting of $\alpha$-cyclodextrin, $\beta$-cyclodextrin, $\gamma$-cyclodextrin, derivatives of $\alpha$-cyclodextrin, derivatives of $\beta$-cyclodextrin, derivatives of $\gamma$-cyclodextrin, derivatives of cyclodextrin prepared by condensation of $\alpha$-, $\beta$-, or $\gamma$-cyclodextrins with epoxides, and mixtures thereof. The cyclodextrin additive 54 is supplied to the aqueous alkaline slurry 24 of the WFGD system 10 as a solid or a solution. An agitator 56 may be used to distribute the cyclodextrin additive 54 throughout the aqueous alkaline slurry 24.

A system 10 for reducing mercury emission or re-emission levels in a cleaned combustion flue gas CFG is also provided comprising a WFGD system 10 with an aqueous alkaline slurry 24 for direct contact with a combustion flue gas FG flowing therethrough, a collection tank 34 for collecting the aqueous alkaline slurry 24 following direct contact with the combustion flue gas FG with one or more dissolved mercury species sensors 38 arranged therein for measuring a dissolved mercury species concentration in the collected aqueous alkaline slurry 24 to obtain a measured dissolved mercury species concentration, a control device 40 to compare the measured dissolved mercury species concentration to a predetermined dissolved mercury species concentration and based thereon control a device 52, and a device 52 being a cyclodextrin additive supply source controlled by the control device 40 is operative for adjusting an amount of a cyclodextrin additive 54 supplied to the aqueous alkaline slurry 24 to increase or decrease dissolved mercury species concentration to reduce levels of mercury emission and/or re-emission in a produced cleaned flue gas CFG. The subject system 10 may further comprise one or more mercury sensors 48 in an outlet 32 of the WFGD system 10 for measuring a mercury concentration in a cleaned flue gas CFG flowing therethrough to obtain a measured mercury concentration, the control device 40 operative to compare the measured mercury concentration to a predetermined mercury concentration and based thereon control the device 52 being a cyclodextrin additive supply source operative for adjusting an amount of a cyclodextrin additive 54 supplied to the aqueous alkaline slurry 24 to increase or decrease dissolved mercury species concentration to reduce levels of mercury emission and/or re-emission in a produced cleaned flue gas CFG. The system 10 may further comprise an agitator 56 to distribute cyclodextrin additive 54 throughout aqueous alkaline slurry 24 wherein the cyclodextrin additive 54 is one or more complexing agents selected from the group consisting of $\alpha$-cyclodextrin, $\beta$-cyclodextrin, $\gamma$-cyclodextrin, derivatives of $\alpha$-cyclodextrin, derivatives of $\beta$-cyclodextrin, derivatives of $\gamma$-cyclodextrin, derivatives of cyclodextrin prepared by condensation of $\alpha$-, $\beta$-, or $\gamma$-cyclodextrins with epoxides, and mixtures thereof.

A system 10 for reducing mercury emission or re-emission levels in a cleaned combustion flue gas CFG is also provided comprising a WFGD system 10 with an aqueous alkaline slurry 24 for direct contact with a combustion flue gas FG flowing therethrough, a collection tank 34 for collecting the aqueous alkaline slurry 24 following direct contact with the combustion flue gas FG with one or more mercury sensors 48 arranged therein for measuring a mercury concentration in the cleaned flue gas CFG to obtain a measured mercury concentration, a control device 40 to compare the measured mercury concentration to a predetermined mercury concentration and based thereon control a device 52 being a cyclodextrin additive supply source operative for adjusting an amount of a cyclodextrin additive 54 supplied to the aqueous alkaline slurry 24 to increase or decrease dissolved mercury species concentration therein to reduce levels of mercury emission and/or re-emission in a produced cleaned flue gas CFG. The subject system 10 may further comprise one or more dissolved mercury species sensors 38 in the aqueous alkaline slurry 24 of the WFGD system 10 for measuring a dissolved mercury species concentration to obtain a measured dissolved mercury species concentration, the control device 40 operative to compare the measured dissolved mercury species concentration to a predetermined dissolved mercury species concentration and based thereon control the device 52 being a cyclodextrin additive supply source operative for adjusting an amount of a cyclodextrin additive 54 supplied to the aqueous alkaline slurry 24 to increase or decrease dissolved mercury species concentration to reduce levels of mercury emission and/or re-emission in a produced cleaned flue gas CFG. The system 10 may further comprise an agitator 56 to distribute cyclodextrin additive 54 throughout aqueous alkaline slurry 24, wherein the cyclodextrin additive 54 is one or more complexing agents selected from the group consisting of α-cyclodextrin, β-cyclodextrin, γ-cyclodextrin, derivatives of α-cyclodextrin, derivatives of β-cyclodextrin, derivatives of γ-cyclodextrin, derivatives of cyclodextrin prepared by condensation of α-, β-, or γ-cyclodextrins with epoxides, and mixtures thereof.

Although the subject matter has been described and illustrated with respect to exemplary embodiments thereof, it is understood by those skilled in the art that the foregoing and various other changes, omissions and additions may be made therein and thereto, without parting from the spirit and scope of the disclosed method and system. Accordingly, other embodiments are within the scope of the following appended claims.

What is claimed is:

1. A method for controlling, reducing or preventing mercury emission or re-emission levels in a cleaned combustion flue gas comprises:
   supplying a combustion flue gas to a WFGD system for direct contact with an aqueous alkaline slurry for removal of contaminants from the flue gas to produce a cleaned flue gas;
   measuring a dissolved mercury species concentration or mercury concentration to obtain a measured concentration value in the WFGD system for comparison to a predetermined concentration value; and
   adjusting an amount of cyclodextrin additive supplied to the WFGD system to increase or decrease the measured concentration value to reduce levels of mercury emission and/or re-emission in the produced cleaned flue gas.

2. The method according to claim 1, wherein the dissolved mercury species concentration is measured in the aqueous alkaline slurry of the WFGD system.

3. The method according to claim 1, wherein the dissolved mercury species concentration is measured in the aqueous alkaline slurry of a spray tower type WFGD system.

4. The method according to claim 1, wherein the mercury concentration is measured in the cleaned flue gas from the WFGD system.

5. The method according to claim 1, wherein the mercury concentration is measured in the cleaned flue gas from a spray tower type WFGD system.

6. The method according to claim 1 wherein the cyclodextrin additive is one or more complexing agents selected from the group consisting of α-cyclodextrin, β-cyclodextrin, γ-cyclodextrin, derivatives of α-cyclodextrin, derivatives of β-cyclodextrin, derivatives of γ-cyclodextrin, derivatives of cyclodextrin prepared by condensation of α-, β-, or γ-cyclodextrins with epoxides, and mixtures thereof.

7. The method according to claim 1, further comprising using an agitator to distribute cyclodextrin additive throughout aqueous alkaline slurry.

8. A system for reducing mercury emission or re-emission levels in a cleaned combustion flue gas comprises:
   a WFGD system with an aqueous alkaline slurry for direct contact with a combustion flue gas flowing therethrough;
   a collection tank for collecting the aqueous alkaline slurry following direct contact with the combustion flue gas with one or more dissolved mercury species sensors arranged therein for measuring a dissolved mercury species concentration in the collected aqueous alkaline slurry to obtain a measured dissolved mercury species concentration;
   a control device to compare the measured dissolved mercury species concentration to a predetermined dissolved mercury species concentration and based thereon control a device; and
   a device controlled by the control device for adjusting an amount of a cyclodextrin additive supplied to the aqueous alkaline slurry to increase or decrease dissolved mercury species concentration to reduce levels of mercury emission and/or re-emission in a produced cleaned flue gas.

9. The system of claim 8, further comprising one or more mercury sensors in an outlet of the WFGD system for measuring a mercury concentration in a cleaned flue gas flowing therethrough to obtain a measured mercury concentration.

10. The system of claim 8, further comprising one or more mercury sensors in an outlet of the WFGD system for measuring a mercury concentration in a cleaned flue gas flowing therethrough to obtain a measured mercury concentration, wherein the control device is operative to compare the measured mercury concentration to a predetermined mercury concentration and based thereon control the device operative for adjusting an amount of a cyclodextrin additive supplied to the aqueous alkaline slurry to increase or decrease dissolved mercury species concentration to reduce levels of mercury emission and/or re-emission in a produced cleaned flue gas.

11. The system according to claim 8, further comprising an agitator to distribute cyclodextrin additive throughout aqueous alkaline slurry.

12. The system according to claim 8 wherein cyclodextrin additive is one or more complexing agents selected from the group consisting of α-cyclodextrin, β-cyclodextrin, γ-cyclodextrin, derivatives of α-cyclodextrin, derivatives of β-cyclodextrin, derivatives of γ-cyclodextrin, derivatives of cyclodextrin prepared by condensation of α-, β-, or γ-cyclodextrins with epoxides, and mixtures thereof.

13. A system for reducing mercury emission or re-emission levels in a cleaned combustion flue gas comprises:
   a WFGD system with an aqueous alkaline slurry for direct contact with a combustion flue gas flowing therethrough,
   a collection tank for collecting the aqueous alkaline slurry following direct contact with the combustion flue gas with one or more mercury sensors arranged therein for measuring mercury concentration in a produced cleaned flue gas to obtain a measured mercury concentration,
   a control device to compare the measured mercury concentration to a predetermined mercury concentration and based thereon control a device, and
   a device controlled by the control device for adjusting an amount of a cyclodextrin additive supplied to the aqueous alkaline slurry to increase or decrease dissolved mercury species concentration in the aqueous alkaline slurry to reduce levels of mercury emission and/or re-emission in the produced cleaned flue gas.

14. The system of claim 13, further comprising
   one or more dissolved mercury species sensors in the aqueous alkaline slurry for measuring a dissolved mercury species concentration to obtain a measured dissolved mercury species concentration, wherein the control device is operative to compare the measured dissolved mercury species concentration to a predetermined dissolved mercury species concentration and based thereon control the device operative for adjusting an amount of a cyclodextrin additive supplied to the aqueous alkaline slurry to increase or decrease dissolved mercury species concentration to reduce levels of mercury emission and/or re-emission in the produced cleaned flue gas.

15. The system according to claim 13 wherein cyclodextrin additive is one or more complexing agents selected from the group consisting of α-cyclodextrin, β-cyclodextrin, γ-cyclodextrin, derivatives of α-cyclodextrin, derivatives of β-cyclodextrin, derivatives of γ-cyclodextrin, derivatives of cyclodextrin prepared by condensation of α-, β-, or γ-cyclodextrins with epoxides, and mixtures thereof.

* * * * *